Sept. 20, 1938. E. F. PAWSAT 2,130,928
BICYCLE LUGGAGE CARRIER
Filed Sept. 17, 1936
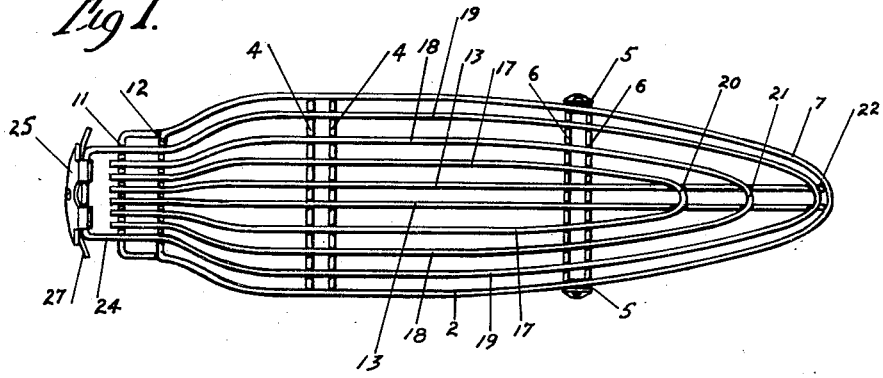
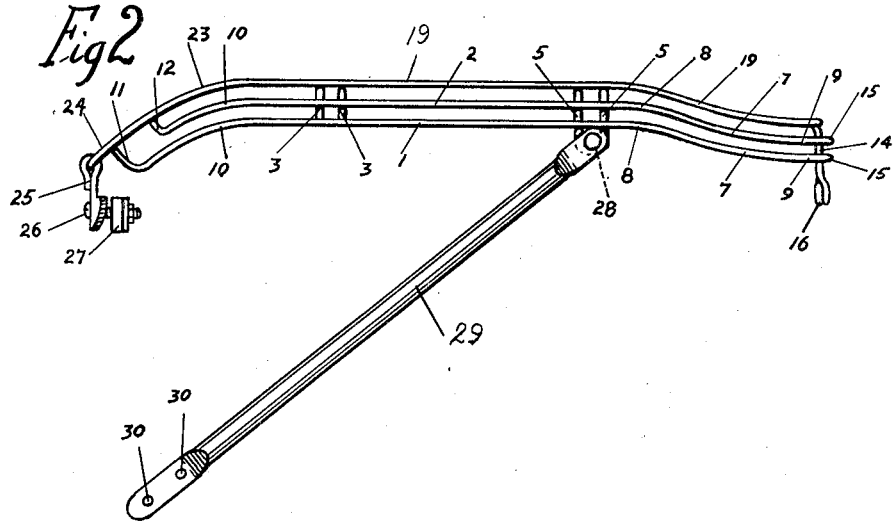
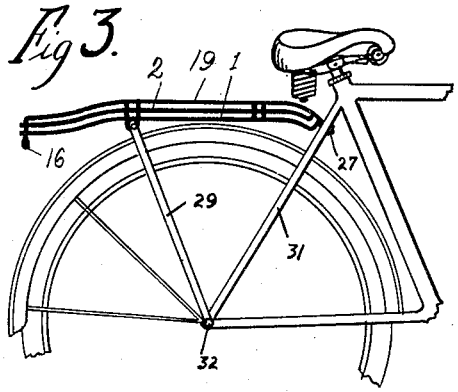
Inventor,
Ewald F. Pawsat,
By Arthur H. Ewald,
Attorney.

Patented Sept. 20, 1938

2,130,928

UNITED STATES PATENT OFFICE 2,130,928

BICYCLE LUGGAGE CARRIER

Ewald F. Pawsat, Maysville, Ky., assignor to Wald Manufacturing Company, Incorporated, a corporation of Kentucky Application September 17, 1936, Serial No. 101,298

1 Claim. (Cl. 224—39)

The present invention relates to bicycle luggage carriers of the type adapted to be secured to a bicycle or similar vehicle over the rear wheel thereof.

The principal object of this invention is to provide a simple, sturdy and efficient device of the character mentioned, and one which while highly ornamental in appearance is inexpensive to manufacture.

A further object of this invention is to provide a luggage carrier for bicycles and similar vehicles, the same being constructed entirely of wire and having side walls which add to the rigidity, strength and durability of the device.

A still further object of the invention is to provide a luggage carrier which has a very wide range of adaptability to the use of straps or ropes for the securing of packages or parcels thereon.

Further objects of the invention will appear from the following detailed description thereof.

In the drawing:

Figure 1 is a top plan view of a luggage carrier constructed in accordance with this invention.

Figure 2 is a side elevation of said luggage carrier.

Figure 3 is an elevation of the rear portion of a bicycle with the luggage carrier attached.

The numerals 1 and 2 indicate respectively side frame elements entering into the construction of my new luggage carrier. Said frame elements are generally oval in shape, are constructed of wire, and are secured to the depending ends 3—3 of a pair of cross wires 4—4. They are also secured to the depending looped end sections 5—5 of a cross wire 6 which is doubled, as clearly shown in Figure 1. The frame elements 1 and 2 are of irregular oval shape tapering to the rear end as shown at 7, the rear ends also being bent downwardly as shown at 8 in Figure 2, and curving toward their ends into substantial parallelism with the main sections of the frames, as shown at 9. The front ends of the frame wires 1 and 2 curve downwardly, as shown at 10, and terminate in upwardly extended cross elements 11 and 12 respectively. Secured to the upper sides of the cross elements 11 and 12, cross wires 4—4 and cross wire 6—6 is a looped wire 13, the two sections of which are substantially parallel and approximately on the longitudinal axis of the frame. The rear end of wire 13 terminates in a depending loop 14 which is secured to the insides of the ends 15—15 of the frame elements 1 and 2. The looped section 14 may be formed with an eye 16. Secured to the upper sides of 11, 12, 4—4 and 6—6 are three looped wires 17, 18 and 19. The rear ends 20, 21 and 22 of the looped wires 17, 18 and 19 are secured to the top side of the sections of wire 13. The rear ends of wires 13, 17, 18 and 19 curve downwardly in substantial parallelism with the rear ends of the frame elements 1 and 2. The front ends of wires 17, 18 and 19 curve downwardly as shown at 23 in parallelism with the curves 10 of frame elements 1 and 2, as clearly shown in Figure 2. Wire 19 extends forwardly beyond the cross wires 11 and 12 and beyond the ends of wires 13, 17 and 18, terminating in a rectangular section 24, to which is hingedly secured a clamp plate 25. The plate 25 is perforated for a bolt 26 by means of which there is secured to said plate a complementary plate 27.

The depending looped ends 5—5 of the wire 6 are formed with eyes 28 within which supporting standards 29 are pivotally secured. The free ends of the standards 29 are provided with a plurality of perforations 30 to attach the standards to vehicles of various sizes.

From the foregoing description, the nature and use of my new luggage carrier will be apparent to those skilled in the art. By means of the complementary clamping plates 25 and 27 the front end of the device is pivotally secured to the bifurcated frame member 31 of a bicycle. The free ends of the standards 29 are secured through the appropriate perforations 30, reference being had to the size of the vehicle, to the respective ends of the rear axle 32 of the bicycle. When the device is so secured, it will be seen that it provides a suitable upper surface which may be used for the support of luggage of various shapes and sizes. By reason of the open wire construction of the device straps or cords may be freely used for securing luggage in any desired manner. The side frame elements 1 and 2 of the device being secured to depending end sections of the cross members, the carrier is thus provided with downwardly extending side walls or flanges, which greatly add to the rigidity or durability of the carrier, and provide also additional elements for the securing of luggage of irregular or overhanging shape or size.

Having thus fully described my invention, what I claim as new and desire to secure by Letters Patent is:

A device of the character specified comprising a plurality of substantially oval frame wires, the front portions of said frame wires curving downwardly and terminating in upwardly extended cross elements, a plurality of cross wires having depending ends, said frame wires being secured to the outsides of the depending portions of said cross wires in vertically displaced relation to each other and so that the horizontal sections of said cross wires are above the uppermost frame wire, a looped wire having parallel sections extending substantially along the longitudinal axis of said frame wires, said looped wire being secured to the upper sides of said cross wires and to the upper sides of said cross elements, the rear end of said looped wire extending downwardly and being secured to the inner rear portion of said frame wires, a plurality of looped wires secured to the upper sides of said cross wires between said frame wires and said first mentioned looped wire, and being secured also to the upper sides of the cross elements of said frame wires, the outer of said last mentioned looped wires extending forwardly beyond said frame wires and being closed by a straight cross member at its front end, a clamp plate pivotally secured to said cross member, means whereby said clamp plate may be secured to the frame of a bicycle, and standards pivotally secured to the depending ends of said cross wires, the free ends of said standards being perforated so as to be secured on the rear axle of said bicycle, whereby said device is supported over the rear wheel thereof.

EWALD F. PAWSAT.